United States Patent [19]
George

[11] Patent Number: 5,179,153
[45] Date of Patent: Jan. 12, 1993

[54] WEAR RESISTANT POLYIMIDE COMPOSITION

[75] Inventor: Daniel E. George, Chadds Ford, Pa.

[73] Assignee: E. I. Du Pont de Nemours and Company, Wilmington, Del.

[21] Appl. No.: 756,962

[22] Filed: Sep. 9, 1991

[51] Int. Cl.$^5$ ............................................. C08K 3/04
[52] U.S. Cl. .................................. 524/495; 524/496; 524/514; 524/545; 524/546
[58] Field of Search ............... 524/514, 495, 496, 545, 524/546

[56] References Cited

U.S. PATENT DOCUMENTS

| | | | |
|---|---|---|---|
| 3,179,614 | 4/1965 | Edwards | 260/30.2 |
| 3,356,759 | 12/1967 | Gerow | 260/857 |
| 3,422,061 | 1/1969 | Gall | 260/47 |
| 3,883,452 | 5/1975 | Scheuerlein et al. | 260/2.5 M |
| 4,238,538 | 12/1980 | Manwiller | 428/36 |
| 4,266,919 | 5/1981 | Dunnington et al. | 425/102 |
| 4,360,626 | 11/1982 | Manwiller | 524/495 |
| 4,898,905 | 2/1990 | Kawakami et al. | 524/404 |

*Primary Examiner*—Paul R. Michl
*Assistant Examiner*—John J. Guarriello

[57] ABSTRACT

Polyimide compositions containing both graphite and fluoropolymer exhibit superior wear performance against aluminum.

8 Claims, No Drawings

WEAR RESISTANT POLYIMIDE COMPOSITION

BACKGROUND OF THE INVENTION

Polyimides, such as those described in Edwards, U.S. Pat. No. 3,179,614, can be used in a wide variety of commercial applications. The outstanding performance characteristics of these polymers under stress and at high temperatures have made them useful in the form of bushings, seals, electrical insulators, compressor vanes and impellers, pistons and piston rings, gears, thread guides, cams, brake linings, and clutch faces.

It is often desirable to incorporate various additives in such polyimide compositions before fabrication into their final form. Accordingly, graphite has been incorporated to improve the wear characteristics in bearing applications. Diamonds have been incorporated for abrasive applications. Fluoropolymers have been incorporated in the past for lubricity in forming and extrusion of shapes.

Despite the variety of polyimides and additives that have previously been available, a continuing problem for fabricated polyimide articles is their wear against aluminum. Specifically, even with the incorporation of graphite or other known lubricants, bearing surfaces in which polyimide and aluminum are brought into contact result in significant wear of both surfaces.

SUMMARY OF THE INVENTION

The present invention provides an improved polyimide composition containing a high level of graphite filler together with polytetrafluoroethylene filler, that exhibits excellent wear characteristics against aluminum and aluminum alloys, with marked reduction of the wear in both surfaces.

Specifically, the present invention provides a polyimide composition consisting essentially of about 40–75 parts of at least one polyimide, about 60–25 parts by weight of graphite substantially free of reactive impurities and about 2–25 parts by weight of at least one fluoropolymer in which at least about 50% of the polymeric units are derived from tetrafluoroethylene.

DETAILED DESCRIPTION OF THE INVENTION

The wear resistant polyimide compositions of the present invention comprise complemental quantities of about 40–75 parts of a polyimide, about 60–25 parts by weight of graphite substantially free from reactive impurities and about 2–25 parts by weight of at least one fluoropolymer in which at least about 50% of the polymeric units are derived from tetrafluoroethylene. Less than about 40 parts of the polyimide can result in a product with tensile properties that do not fully meet the uses for which polyimide parts are normally prepared. With greater than about 75 parts of the polyimide in the final composition, the advantages in wear resistance of the present invention are not fully realized.

A wide variety of polyimides can be used, including those described in Edwards, U.S. Pat. No. 3,179,614, hereby incorporated by reference. The polyimides described therein are prepared from at least one diamine and at least one anhydride. Preferred diamines which can be used include m-phenylene diamine (MPD), p-phenylene diamine (PPD), oxydianiline (ODA), methylene dianiline (MDA) and toluene diamine (TDA). Preferred anhydrides which can be used include benzophenone tetracarboxylic dianhydride (BTDA), biphenyl dianhydride (BPDA), trimellitic anhydride (TMA), pyromellitic dianhydride (PMDA), maleic anhydride (MA) and nadic anhydride (NA).

Preferred polyimides which can be used in the present invention include those prepared from the following combinations of anhydride and diamine: BTDA-MPD, MA-MDA, BTDA-TDA-MDA, BTDA-MDA-NA, TMA-MPD & TMA-ODA, BPDA-ODA & BPDA-PPD, BTDA-4,4'-diaminobenzophenone, and BTDA-bis(p-aminophenoxy)-p,p'-biphenyl. An especially satisfactory polyimide in the present invention is that prepared from pryomellitic dianhydride and 4,4'-oxydianiline.

The graphite which can be used in the present invention is substantially free from reactive impurities, that is, those impurities which have an adverse effect on the oxidative stability of blends with polyimides. In general, the graphite should have less than about 0.15 weight percent of such reactive impurities, and preferably less than about 0.10 weight percent. Typical of such reactive impurities are metal oxides and sulfides, and particularly ferric sulfide, barium sulfide, calcium sulfide, copper sulfide, barium oxide, calcium oxide, and copper oxide.

The unusually pure graphite used in accordance with the instant invention can be either naturally occurring graphite or synthetic graphite. Natural graphite generally has a wide range of impurity concentrations, while synthetically produced graphite having low reactive impurity concentrations is commercially available. Graphite containing an unacceptably high concentration of impurities can be purified by chemical treatment with a mineral acid. For example, treatment of the impure graphite with sulfuric, nitric or hydrochloric acid at elevated or reflux temperatures can reduce the impurities to an acceptable level. Alternatively, graphite compositions are available that typically satisfy the purity levels required in the instant invention, such as "Lonza Graphite KS-10" commercially available from Lonza, Inc.

About 60–25 parts of the substantially pure graphite are present in the composition. Less than about 25 parts of the graphite can result in a product that does not exhibit the outstanding wear characteristics of the present invention, while greater than 60 parts of graphite will generally depreciate the tensile properties of the final polyimide part.

The third component required in the present compositions is about 2–25 parts by weight of at least one fluoropolymer. Less than about 2 parts of the fluoropolymer does not provide the desired improvement in wear characteristics, while greater than about 25 parts can depreciate the physical properties of the final composition.

The composition of the fluoropolymer can vary widely, so long as at least about 50%, and preferably at least about 75%, of the polymeric units are derived from tetrafluoroethylene. The balance of the polymeric units can be derived from any fluoroolefin which is copolymerizable with the tetrafluoroethylene, such as vinyl fluoride and hexafluoropropene. Polytetrafluoroethylene homopolymer is particularly preferred on the basis of its low cost and ready availability. Of these, high molecular weight homopolymer such as that commercially available from the Du Pont Company as Teflon ® 7A is particularly effective in the range of 4 to 20 parts by weight, with best results attained at 9 to 13 parts by weight. Low molecular weight PTFE homopolymer such as that commercially available from the Du Pont Company as Teflon ® MP-1000 is particularly effective at about 2.5 parts by weight.

The present compositions can further comprise up to about 10 weight % of other additives, fillers and dry lubricants which do not depreciate the overall performance characteristics of the finished polyimide parts, as will be evident to those skilled in the art. Typical of such additional additives are tungsten disulfide and molybdenum disulfide.

In the preparation of the present compositions, the order of addition is not critical. The three basic components, the polyimide, the graphite, and the fluoropolymer, can be blended using conventional milling techniques in the required quantities. In the alternative, some commercially available polyimides contain encapsulated graphite, to which additional graphite can be added by conventional blending techniques to bring the total concentration to the ranges required in the instant invention. The high purity graphite can be blended under high shear with the fluoropolymer. The fluoropolymer is preferably maintained in a cooled state, for example, below about 20° C., and preferably about from 0 to 10° C., to facilitate blending.

After the combination of the three essential components of the compositions, they can be formed and further processed according to conventional handling techniques for polyimides.

The present polyimide compositions, when processed into parts, are suitable as wear surfaces in the form of bushings, seals, thrust washers, compressor vanes and impellers, pistons and piston rings, gears, and cams, especially where the mating surface is aluminum or an aluminum alloy. They exhibit greatly improved resistance to wear against such aluminum and aluminum alloys, compared with the unfilled polyimide, or polyimide filled with graphite or polytetrafluoroethylene alone, or polyimide filled with polytetrafluoroethylene and low levels of graphite. The present compositions give such improved performance when tested, for example, against Types 6061, 7075, and 2024 wrought aluminum alloys and against Type A360 die cast aluminum alloy.

The present invention is further illustrated by the following specific Examples and Comparative Examples, in which parts and percentages are by weight unless otherwise indicated.

In these Examples, the present compositions showed increased wear resistance when tested against an aluminum alloy by at least 2-fold and as great as 300-fold compared with the unfilled polyimide or polyimide filled with graphite or PTFE alone, or polyimide filled with PTFE and a level of graphite lower than that specified in the present invention. Even more importantly, the wear of the aluminum mating surface is reduced several fold. In most cases, the metal suffered little or no measurable wear, whereas the comparative compositions caused severe wearing of grooves, with substantial loss of metal surface, which in turn accelerated the loss of material from the polyimide surface. There appears to be a synergistic effect between the high graphite content and the PTFE in preventing the initiation of this severe type of wear.

In each of the examples, polyimide resins were prepared from pyromellitic dianhydride and 4,4'-oxydianiline, according to the procedures of U.S. Pat. No. 3,179,614. The indicated quantities of graphite powder were generally incorporated into the polymer solution prior to precipitation as the polyimide. In some examples, where indicated, additional graphite was added to the polyimide powder by dry blending. The indicated quantities of polytetrafluoroethylene (PTFE) were added to the dry polyimide/graphite powder by blending with a cutting blade to shear the PTFE particles and thus produce a dispersion of fine PTFE particles in the polyimide resin. To facilitate the cutting, the PTFE was cooled in dry ice just prior to blending.

The resulting filled resin powders were converted into pellets of nominal dimensions, 0.5"×0.625"×0.25", by direct forming at a pressure of 100,000 psi at room temperature. The resulting parts were sintered for three hours at 400° C. under nitrogen at atmospheric pressure. After cooling to room temperature, the pellets were machined to final dimensions required for testing. The 0.25" wide contact surface of the block was machined to such a curvature that it conformed to the outer circumference of the 1.375" diameter×0.375" wide mating metal ring. The blocks were oven dried and maintained dry over desiccant until tested.

The parts were tested for wear using a Falex No. 1 Ring and Block Wear and Friction Tester. The equipment is described in ASTM test method D2714. The polyimide block was mounted in a stationary position above the rotating metal mating ring and loaded against it with 190 psi pressure. The rotational velocity of the ring was 370 rpm or 134 feet per minute. The P×V, therefore, was about 25,000 psi-fpm. No lubricant was used between the mating surfaces.

Initial weight and thickness of the block and weight of the ring were measured prior to starting the wear test. An initial break-in period of 1.5 hours was run, after which the ring and block were weighed and the block thickness measured. The test was re-started and run for an additional six hours, after which the test was terminated and again measurements taken on both ring and block. Calculated wear rates for the entire 7.5 hour test period are shown in Tables I-VII.

Three different types of aluminum alloy rings were available from the manufacturer of the Falex tester. These are Type 2024, with copper as the major alloying element; Type 6061, with silicon and magnesium the major alloying elements; and Type 7075, with zinc the major alloying element. Rings were also machined from a die casting of A360 aluminum containing about 9–1.0% silicon.

EXAMPLES 1 TO 4 AND COMPARATIVE EXAMPLES A TO G

In Examples 1 to 4, a commercial polyimide resin prepared from pyromellitic dianhydride and 4,4'-oxydianiline combined with 35–39 weight per cent of high purity graphite, as described in U.S. Pat. No. 4,360,626, was blended with a high molecular weight polytetrafluoroethylene (commercially available from the Du Pont Company as Teflon ® 7A) added in such quantities as to yield the percentages of graphite and PTFE shown in Table I.

In Comparative Examples A to D, commercial polyimide resins were used prepared from pyromellitic dianhydride and 4,4'-oxydianiline. The resin used in Comparative Example A contained no graphite or PTFE, B and C contained graphite, and D contained PTFE added to the graphite-filled resin of Comparative Example B. Comparative Examples F and G contained PTFE added to the unfilled resin of Comparative Example A.

All compositions were wear tested against Type 6061 aluminum rings, using the procedure described above. The test results are summarized in Table I.

TABLE I

| Ex. No. | Graphite wt % | PTFE wt % | Polyimide wear volume cc × 10−3 per hour | Aluminum wear volume cc × 10−3 per hour |
|---|---|---|---|---|
| 1 | 35.2 | 4.8 | 0.47 | 0.17 |
| 2 | 33.6 | 9.1 | 0.27 | 0.00 |
| 3 | 32.2 | 13.0 | 0.23 | 0.00 |
| 4 | 30.8 | 16.7 | 0.85 | 0.00 |
| A | 0.0 | 0.0 | 70.13 | 17.33 |
| B | 15.0 | 0.0 | 16.59 | 1.30 |
| C | 37.0 | 0.0 | 1.56 | 0.28 |
| D | 13.6 | 9.1 | 4.19 | 1.46 |
| E | 13.0 | 13.0 | 5.63 | 1.30 |
| F | 0.0 | 9.1 | 9.52 | 0.61 |
| G | 0.0 | 16.7 | 9.55 | 0.83 |

EXAMPLE 5 AND COMPARATIVE EXAMPLES H AND I

The procedure of Examples 1 to 4 and Comparative Examples A to G was repeated, except that a low molecular weight PTFE (commercially available from the Du Pont Company as Teflon® MP-1000) was used instead of the high molecular weight PTFE, and was added in quantities shown in Table II to the commercial polyimide composition containing 35-39 wt % high purity graphite. The resulting compositions were tested as before, and the test results against Type 6061 aluminum rings are summarized in Table II.

TABLE II

| Ex. No. | Graphite wt % | PTFE wt % | Polyimide wear volume cc × 10−3 per hour | Aluminum wear volume cc × 10−3 per hour |
|---|---|---|---|---|
| 5 | 36.1 | 2.4 | 0.56 | 0.07 |
| H | 36.8 | 0.5 | 1.67 | 0.72 |
| I | 36.6 | 1.0 | 2.27 | 0.44 |

EXAMPLES 6 TO 11 AND COMPARATIVE EXAMPLES J AND K

The procedure of Examples 1 to 4 and Comparative Examples A to G was repeated, except that the graphite content was varied over a wider range. In Examples 6, 8 and 11, and Comparative Examples J and K, resins of the graphite content shown in Table III were prepared in the laboratory to give a range not available in commercial products. In Examples 7, 9 and 10, additional graphite was added to commercially available resin to increase the content to the levels indicated in Table III. The compositions were tested as before, and the test results against 6061 aluminum rings are summarized in Table III.

TABLE III

| Ex. No. | Graphite wt % | PTFE wt % | Polyimide wear volume cc × 10−3 per hour | Aluminum wear volume cc × 10−3 per hour |
|---|---|---|---|---|
| 6 | 27.3 | 9.1 | 0.92 | 0.29 |
| 7 | 36.4 | 9.1 | 0.64 | 0.01 |
| 8 | 40.9 | 9.1 | 0.91 | 0.00 |
| 9 | 38.8 | 9.1 | 0.69 | 0.00 |
| 10 | 40.9 | 13.0 | 0.19 | 0.00 |
| 11 | 26.1 | 13.0 | 1.57 | 0.55 |
| J | 18.2 | 9.1 | 12.33 | 1.02 |
| K | 17.4 | 13.0 | 10.49 | 0.97 |

COMPARATIVE EXAMPLES L and M

The procedure of Examples 1 to 4 and Comparative Examples A to G was repeated, except that the resins were prepared using a natural graphite of high ash content. The test results against 6061 aluminum are summarized in Table IV.

TABLE IV

| Ex. No. | Graphite wt % | PTFE wt % | Polyimide wear volume cc × 10−3 per hour | Aluminum wear volume cc × 10−3 per hour |
|---|---|---|---|---|
| L | 27.3 | 9.1 | 3.87 | 1.80 |
| M | 40.9 | 9.1 | 3.51 | 1.59 |

EXAMPLES 12 to 15 AND COMPARATIVE EXAMPLE N

The procedure of Examples 1 to 4 and Comparative Examples A to G was repeated, except that testing was performed against Type 7075 aluminum instead of Type 6061. The test results are summarized in Table V.

TABLE V

| Ex. No. | Graphite wt % | PTFE wt % | Polyimide wear volume cc × 10−3 per hour | Aluminum wear volume cc × 10−3 per hour |
|---|---|---|---|---|
| 12 | 33.6 | 9.1 | 0.49 | 0.11 |
| 13 | 32.2 | 13.0 | 0.85 | 0.06 |
| 14 | 42.7 | 9.1 | 0.27 | 0.08 |
| 15 | 40.9 | 13.0 | 0.25 | 0.00 |
| N | 37.0 | 0.0 | 3.59 | 1.19 |

EXAMPLE 16 AND COMPARATIVE EXAMPLE O

The procedure of Examples 1 to 4 and Comparative Examples A to G was repeated, except that Comparative Examples A to G was repeated, except that testing was performed against Type 2024 aluminum instead of Type 6061. The test results are summarized in Table VI.

TABLE VI

| Ex. No. | Graphite wt % | PTFE wt % | Polyimide wear volume cc × 10−3 per hour | Aluminum wear volume cc × 10−3 per hour |
|---|---|---|---|---|
| 16 | 33.6 | 9.1 | 0.45 | 0.00 |
| O | 13.6 | 9.1 | 4.19 | 1.98 |

EXAMPLES 17 AND 18 AND COMPARATIVE EXAMPLE P

The procedure of Examples 1 to 4 and Comparative Examples A to G was repeated, except that testing was performed against Type A360 die cast aluminum instead of Type 6061. The test results are summarized in Table VII.

TABLE VII

| Ex. No. | Graphite wt % | PTFE wt % | Polyimide wear volume cc × 10−3 per hour | Aluminum wear volume cc × 10−3 per hour |
| --- | --- | --- | --- | --- |
| 17 | 32.2 | 13.0 | 0.53 | 0.05 |
| 18 | 40.9 | 13.0 | 0.91 | 0.00 |
| P | 13.6 | 9.1 | 0.92 | 0.18 |

I claim:

1. A polyimide composition having improved resistance to wear against aluminum and aluminum alloys and consisting essentially of about 40-75 parts of at least one polyimide, about 60-25 parts by weight of graphite substantially free from reactive impurities and about 2-25 parts by weight of at least one fluoropolymer in which at least about 50% of the polymeric units are derived from tetrafluoroethylene.

2. A polyimide composition of claim 1 wherein the polyimide consists essentially of a single polyimide.

3. A polyimide composition of claim 2 wherein the polyimide consists essentially of polymer prepared from dianhydride and 4,4'-oxydianiline.

4. A polyimide composition of claim 1 wherein the graphite contains less than about 0.15 weight percent of reactive impurities.

5. A polyimide composition of claim 4 wherein the graphite contains less than about 0.10 weight percent of reactive impurities.

6. A polyimide composition of claim 4 wherein the graphite is substantially free from metal oxides and sulfides.

7. A polyimide composition of claim 1 wherein at least about 75% of the polymeric units in the fluoropolymer are derived from tetrafluoroethylene.

8. A polyimide composition of claim 7 wherein the fluoropolymer consists essentially of polytetrafluoroethylene homopolymer.

* * * * *